United States Patent
Schmid et al.

(10) Patent No.: US 9,687,806 B2
(45) Date of Patent: Jun. 27, 2017

(54) FLUIDIZED BED REACTOR SYSTEM

(71) Applicant: TECHNISCHE UNIVERSITAET WIEN, Vienna (AT)

(72) Inventors: Johannes Schmid, Vienna (AT); Tobias Proell, Vienna (AT); Hermann Hofbauer, Vienna (AT)

(73) Assignee: TECHNISCHE UNIVERSITAET WIEN, Vienna (AT)

( * ) Notice: Subject to any disclaimer, the term of this patent is extended or adjusted under 35 U.S.C. 154(b) by 32 days.

(21) Appl. No.: 14/442,115

(22) PCT Filed: Nov. 11, 2013

(86) PCT No.: PCT/AT2013/050216
§ 371 (c)(1),
(2) Date: May 12, 2015

(87) PCT Pub. No.: WO2014/071436
PCT Pub. Date: May 15, 2014

(65) Prior Publication Data
US 2016/0288076 A1     Oct. 6, 2016

(30) Foreign Application Priority Data
Nov. 12, 2012  (AT) ................................ A 1202/2012

(51) Int. Cl.
*B01J 8/38*     (2006.01)
*B01J 8/34*     (2006.01)
(Continued)

(52) U.S. Cl.
CPC ............. *B01J 8/388* (2013.01); *B01J 8/0055* (2013.01); *B01J 8/26* (2013.01); *B01J 8/34* (2013.01); *B01J 2208/00548* (2013.01)

(58) Field of Classification Search
CPC ..... B01J 8/34; B01J 8/388; B01J 8/085; B01J 8/189; B01J 8/1881; B01J 8/12; B01J 8/008; B01J 8/0055
See application file for complete search history.

(56) References Cited

U.S. PATENT DOCUMENTS 3,353,925 A    11/1967  Baumann et al.
3,964,876 A *   6/1976  James ....................... B01J 8/24
                                                    208/155
(Continued)

FOREIGN PATENT DOCUMENTS

DE            19700029 A1   7/1998
DE         102007005799 A1   4/2008
(Continued)

*Primary Examiner* — Lessanework Seifu
(74) *Attorney, Agent, or Firm* — Leydig, Voit & Mayer, Ltd.

(57) ABSTRACT

A fluidized bed reactor system with one or more fluidized bed reactors for carrying out chemical or physical reactions, at least one reactor thereof being a rapidly fluidized reactor to be operated as a circulating fluidized bed and having, at the upper end, a fluid outlet, a particle separator, and a particle line connected thereto for the purpose of feeding back separated fluidized bed particles into the same or a further reactor, wherein, at least one rapidly fluidized reactor has one or more flow control devices producing reaction zones that are separate from one another, and in order to control the flow conditions into the reaction zones, one or more of these flow control devices are specifically adjustable from outside of the system.

20 Claims, 7 Drawing Sheets

(51) Int. Cl.
*B01J 8/26* (2006.01)
*B01J 8/00* (2006.01)

(56) References Cited

U.S. PATENT DOCUMENTS

| | | | |
|---|---|---|---|
| 4,269,218 A * | 5/1981 | Sudo | F16K 5/0407 137/240 |
| 2010/0119440 A1 | 5/2010 | Muehlen | |
| 2011/0120560 A1 | 5/2011 | Proll et al. | |
| 2013/0143167 A1 | 6/2013 | Proell et al. | |

FOREIGN PATENT DOCUMENTS

| WO | WO 9425148 A1 | 11/1994 |
|---|---|---|
| WO | WO 2009021258 A1 | 2/2009 |
| WO | WO 2011153568 A1 | 12/2011 |
| WO | WO 2012009737 A1 | 1/2012 |

* cited by examiner

FLUIDIZED BED REACTOR SYSTEM

CROSS-REFERENCE TO RELATED APPLICATIONS

This application is a U.S. national stage application under 35 U.S.C. §371 of International Application PCT/AT2013/050216, filed on Nov. 11, 2013, and claims benefit to Austrian Patent Application No. AI202/2012, filed on Nov. 12, 2012. The International Application was published in German on May 15, 2014, as WO 2014/071436 A1 under PCT Article 21(2).

FIELD OF THE INVENTION

The invention relates to a fluidized-bed reactor system for carrying out chemical or physical reactions comprising one or more fast fluidized bed reactors.

BACKGROUND OF THE INVENTION

Both in physical procedures and chemical reactions, involving an exchange of material between two phases, large contact surfaces and thorough mixing of the phases are just as decisive as long residence times in corresponding contact or reaction zones in order to obtain high turnover and yields. This equally applies to all phase transfers, regardless whether the material exchange is to take place between solid, liquid or gaseous phases.

One possibility for extending contact times and increasing contact surfaces or the number of contacts with discrete particles in the case of solid-liquid and solid-gas contacts consists in leading the two phases to be contacted in countercurrent flow, as it is, for example, described for spray columns, (sometimes multi-staged) fluidized-bed reactors, countercurrent contactors and packed columns by A. W. M. Roes and W. P. M. Van Swaaij, Chem. Eng. J. 17, 81-89 (1979). In DE 10 2007 005 799 A1 (published on 24 Apr. 2008), the countercurrent principle is described as a specific example of pyrolysis reactions and heat transfer processes. Therein, pyrolysis coke is used as a fuel and converted into a product gas which is rich in hydrogen and has a high calorific value, wherein bulk material serving as heat transfer medium is circulated by means of a bulk material conveyer and is conducted in countercurrent flow to the gas stream containing the product gas.

Another possibility for increasing the surface, which is also suggested by Roes and Van Swaaij (supra), provides for internals, which are well known in the field of packed columns or rotating disk columns.

An increase of the residence times in contactors or reactors may, for example, also be achieved by providing flow controllers or restrictors to create zones of differing flow rates of the phases to be contacted with each other. One example of such a fluidized-bed reactor is described in Kersten et al., Chem. Eng. Sci. 58, 725-731 (2003). Therein, a circulating fluidized-bed reactor for biomass gasification is described, which is partitioned into zones of different densities of both the circulating solid and the carrier and combustion gases by means of a regular sequence of conical expansions in the riser, wherein solid particles and gases are conducted in the riser in cocurrent flow. The high velocities in the comparably very tight risers below each conical expansion do not allow the particles to move downwards. This is called spouted beds connected in series. A similar example for improving the flow profile in a fluidized-bed reactor is described by J. Bu and J.-X. Zhu, Canadian J. Chem. Eng. 77, 26-34 (February 1999), where annular internals are provided in the riser of a circulating fluidized-bed reactor, having a similar effect as the conical expansions according to Kersten et al. (supra).

For fluidized-bed reactor systems in which two or more fluidized reactors communicate with each other, the above measures for improving contact or material exchange between two phases, specifically between a solid and a liquid or gaseous phase, is hardly known. For example, Berguerand and Lyngfelt describe in Fuel 87, 2713-2726 (2008) the provision of an alternating arrangement of overflow and underflow weirs in a fluidized-bed reactor system with two fluidized-bed reactors. This arrangement called "particle lock", however, serves only for separating particles of different densities and not for increasing contact between the particles and the gas phase.

U.S. Pat. No. 3,353,925 discloses several "nozzle-type" contractions in the cross-section of a fast-fluidized reactor in a fluidized-bed system, which in addition comprises two reactors not transporting any particles. These contractions serve to improve contact between gas and particles, which in this case flow concurrently.

In Ind. Eng. Chem. Res 43(18), 5611-5619 (2004), Bi et al. disclose installations called "baffles", which serve for destroying larger rising bubbles and separating them into smaller ones in a stationary, i.e. bubbling bed, in order to increase homogeneity of the bed.

Finally, the inventors of the present subject matter developed a fluidized-bed reactor system in earlier research work that comprises at least two fast fluidized bed reactors, in at least one of which different reaction zones separated by one or more flow controllers are provided and wherein the particle line for transporting the fluidized-bed particles from other reactors into this one joins it above at least one flow controller (PCT/AT2011/000254). One example for such a system is shown in FIG. 1 herein and will be described in detail later on. The type of flow controller is not particularly limited and any constriction or expansion of the reactor cross-section, deflection of the particle stream or combination thereof can be provided, e.g. a "zigzag" course of the reactor pipe or the provision of various installations, such as e.g. central or lateral baffles, annular constrictions etc., which in addition can be at any angle to the flow direction. The type of flow controller is mainly determined by the intended purpose of the fluidized-bed reactor system and by the respective usable reactor wall material.

The main disadvantage of all known embodiments of flow controllers in fluidized-bed reactors is, however, that after their successful installation in the reactor(s), the flow paths therein are fixed, so that a rearrangement of the reactor system is required for any change, which of course requires the system to be shut down.

BRIEF SUMMARY OF THE INVENTION

An aspect of the invention provides a fluidized-bed reactor system, comprising: a fast fluidized bed reactor configured to carry out chemical or physical reactions, wherein the fast fluidized bed reactor is configured to be operated as a circulating fluidized bed, wherein the fast fluidized bed reactor comprises, at the upper end, a fluid outlet, a particle separator, and a particle line connected so as to feed back separated fluidized-bed particles into the same or another reactor, wherein one or more flow controllers are provided in at least one fast fluidized reactor in order to create separate reaction zones therein, and wherein one or more of the flow controllers are accurately adjustable from outside of the system to control flow conditions in the reaction zones.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION OF THE INVENTION

Figure 1:
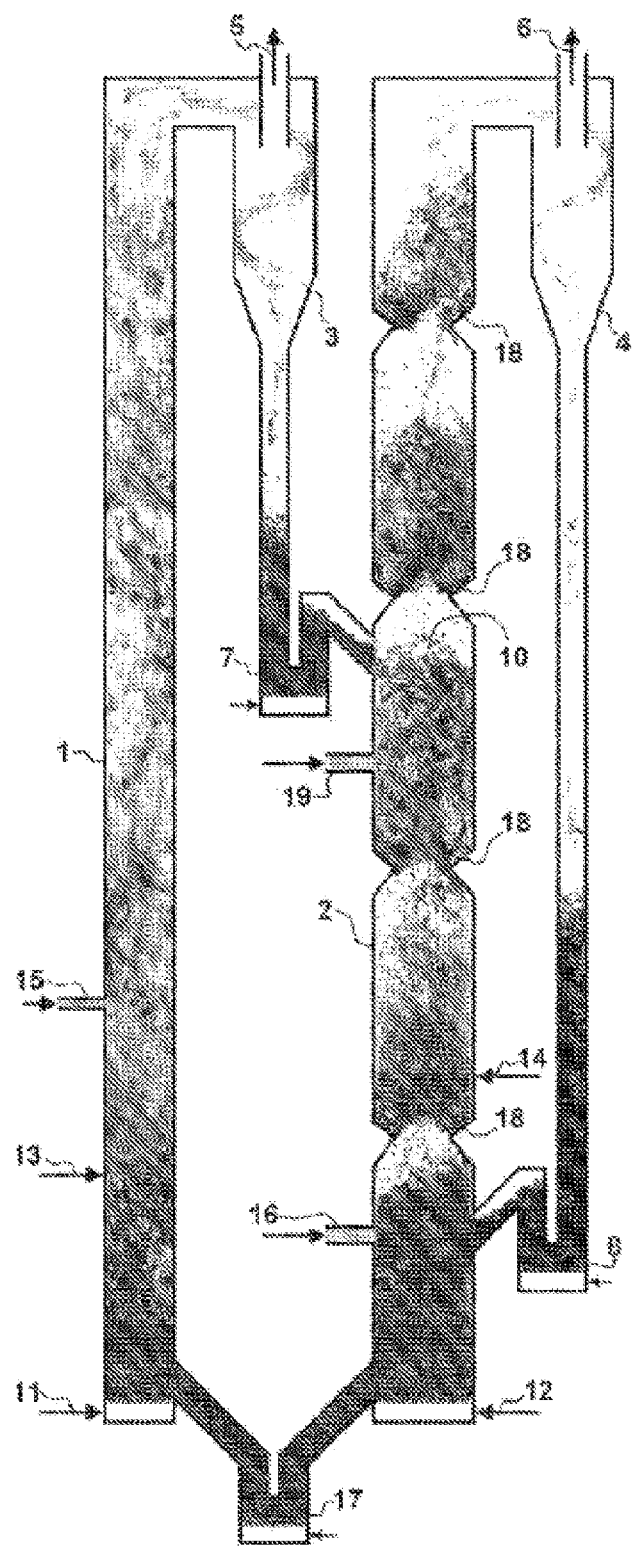
FIG. 1 schematically shows a fluidized-bed reactor system according to the state of the art with non-adjustable flow controllers.

Against this background, it is an aspect of the invention to develop a more flexible fluidized-bed reactor system with variable flow paths.

An aspect of the present invention provides a fluidized-bed reactor system comprising one or more fluidized-bed reactors for carrying out chemical or physical reactions, wherein at least one reactor is implemented as a fast fluidized reactor to be operated as a circulating fluidized bed and comprises, at the upper end, a fluid outlet, a particle separator, and a particle line connected therewith to feed back separated fluidized-bed particles into the same or another reactor, wherein one or more flow controllers are provided in at least one fast fluidized reactor in order to create separate reaction zones therein, the inventive system being characterized in that one or more of the flow controllers are accurately adjustable from outside of the system to control the flow conditions in the reaction zones.

By providing accurately adjustable flow controllers, the flow path and/or the flow rate of the fluidized bed at that location within the respective reactor can be controlled. For the first time, this allows accurately influencing, i.e. controlling, the flow properties of the fluidized bed in a fluidized-bed reactor thus equipped, which substantially increases flexibility. Shutting down the system to provide or exchange respective reactor installations, which is time-consuming and costly, is therefore unnecessary.

In the simplest embodiment of the invention with only one fast fluidized bed reactor, which may be the only reactor in the system, the fluidized bed can be conducted preferably into certain regions of the reactor—or specifically into a reaction zone positioned directly above, through which less fluidized-bed particles flowed with the original position of the flow controller, by adjusting such a accurately adjustable flow controller of the invention. In preferred embodiments of the invention, adjusting such an accurately adjustable flow controller allows changing the horizontal cross-section of the respective reactor at the height of this flow controller, which causes an increase or decrease of the flow rate at that location, which again results in the presence of more or less particles in the reaction zone directly above it.

In other preferred embodiments of the invention, the flow controllers are not (or not only) adjustable horizontally, but (also) vertically, which allows controlling the size of the reaction zones above or—if several flow controllers are present—in between. In addition, mixtures of horizontally and vertically adjustable flow controllers in a fluidized-bed reactor system, sometimes in one and the same fluidized-bed reactor, are also possible, and as mentioned above a flow controller can be adjustable horizontally as well as vertically. In any case, the object is to set the fluid-dynamically most advantageous condition in each reaction zone in the respective reactor and thus in the entire fluidized-bed reactor system.

The way in which the accurately adjustable flow controllers are changeable in their position is not specifically limited as long as the position change and the change of the flow conditions associated therewith can be accurately achieved at that location. This does not, however, refer to simple tilting or turning due to initial contact with the fluidized-bed particles when the fluidized-bed reactor is put in operation. In one embodiment of the invention, however, one or more of the inventive accurately adjustable flow controllers are provided and mounted in a way to provide an obstacle for the fluidized-bed flow, as long as a certain measure of fluidization is not reached and no corresponding pressure acts on the flow controllers. As soon as this pressure is reached, the flow controllers can move, i.e. they fold or tilt or turn sideways, so that the flowing obstacle is removed or at least reduced and the fluidized bed can take a different flow path and/or assume a different flow rate than before.

In general, the accurately adjustable flow controllers can be adjusted by hand or motor-driven, and both variations can appear within one reactor or reactor system. After such an accurate adjustment, the flow controllers can sometimes also assume a certain position in order to maintain the desired flow condition. The above dependence of the flow controllers on the flow strength of the fluidization gas of the fluidized bed constitutes a special case of adjustability by hand because the gas flow is usually accurately controllable from outside. Otherwise any type of lever, turning wheel or slider or the like can be provided at the flow controllers to allow their adjustment by hand form outside. Or the flow controllers are drivable by means of a, e.g. electric, hydraulic or pneumatic, motor, which causes a movement and thus a corresponding change of position of the flow controller.

Preferably, the accurately adjustable flow controllers of the invention are supported rotatably, swivellably and/or slidably on or in the respective reactor wall, as can for example be seen in the accompanying drawings. The direction of movement is not limited as long as the operation of the fluidized-bed reactor is not impaired. This means that all adjustable flow controllers are moveable, preferably rotatable, swivellable and/or slidable, in all three directions in space. Their size can also be chosen freely, as long as the reactor operation can be maintained as desired. In some embodiments, the entire reactor cross-section can be closed by a flow controller until latter is moved into a different position, such as in the above special case where the movement of the flow controller is caused by the exertion of a certain pressure of the fluidized bed on the flow controller, or in case an adjustable flow controller is provided that consists of an arrangement of overlapping lamellas, which are moved by a motor (similar to a leaf shutter of a camera). The flow controller moved by means of the fluidized bed pressure can also comprise lamellas, which open upwards when the fluidization pressure is high enough and return to completely or partly close the cross-section when the pressure falls below the threshold.

In general, the type and shape of the accurately adjustable flow controller is not particularly limited. In addition to the embodiments described above with lamellas, various types of components, such as sliders, flaps, rolls or the like are possible, which again can have any shape, as long as they are able to controllably influence the flow path and/or flow cross-section for the fluidized bed. They can have fluidically advantageous cross-sections, i.e. shapes with low flow resistance, such as circular, oval or spherical, or cross-sections with comparably high flow resistance, such as sharp-edged shapes. In some embodiments the flow controllers can also be a mixture of both variations, for example they can have a fluidically favorable profile in the position in which the fluidized bed is to pass them as freely as possible, in the position in which the fluidized bed is to be partly blocked, on the other hand, a profile with high flow resistance. In general, of course, high flow resistances are not preferred in fluidized-bed reactors, in order to be able to keep the pressure of the fluidization gas low, which is why according to the present invention flow controllers with low flow resistance are preferred, which unfold their effect mainly be reducing the flow cross-section. Particularly preferred examples are shown in the accompanying drawings, which are explained in detail below.

An inventive fluidized-bed reactor system can comprise one or more accurately adjustable as well as one or more fixed flow controllers according to the state of the art as described at the beginning, in separate reactors as well as within the same reactor.

The material of both types of flow controllers is not particularly limited. The same holds for the material of the reactor walls. For example, for CLR, CLC, gasification and other applications which require high temperatures, mainly refractory and other temperature-resistant materials, e.g. chamotte bricks, heat-resistant steel, concrete, ceramics or graphite, are used as the wall materials, and the flow controllers, adjustable or not, are preferably also made of such materials in order to guarantee long durability. This comprises all components of the flow controllers, including various bearings, hinges, axles and the like.

As mentioned before, a fluidized-bed reactor system of the invention can comprise only one fluidized-bed reactor or only one fast fluidized bed reactor as well as one or more other reactors, e.g. stationary fluidized-bed reactors. Preferably, an inventive fluidized-bed reactor system comprises two reactors, both of which are implemented as fast fluidized bed reactors, wherein a particle line connects the particle separator of the first reactor with the second reactor, another particle line leads from the particle separator of the second reactor back into the second reactor, and a third particle line leads from the second back into the first reactor (wherein the third particle line connects the two reactors preferably in their lower halts, more preferably lower thirds or quarters), wherein one or more accurately adjustable flow controllers are provided at least in the second reactor. One example of such a system according to the state of the art, i.e. without the accurately adjustable flow controllers of the invention, as mentioned at the beginning, is shown in FIG. 1 and described in detail below.

According to the present invention it is preferred that one or more accurately adjustable flow controllers are provided in both reactors of such a fluidized-bed reactor system in order to allow for controlling the flow conditions in both reactors. In addition, at least one particle line joins the respective reactor above the at least one flow controller in order to provide a certain particle concentration in the reaction zone above the flow controller, without the necessity, at least for a short term, to set an excessively high mass or volume flow of the fluidization gas to transport enough particles into this reaction zone.

Preferably, two of the reactors of the inventive fluidized-bed reactor system are also connected to each other via a line substantially transporting only gas, as was found in earlier research on the present subject matter (PCT/AT2011/000311) and as shown herein in FIG. 3 and explained in detail later on in connection therewith.

A "fluidized bed" as used herein refers to a charge of solid particles that is put into a fluidized, i.e. flowable, condition by means of a fluid stream. Such "fluids" are in particular pure gases or gas mixtures, herein in general also mixtures of gases and liquids and/or solids, wherein usually only comparably low amounts of liquids (e.g. in the form of droplets) or solids are contained in the fluidization gas.

Fluidized beds can either be "stationary" or "fast fluidized". In the first case, the fluidized charge has a clearly recognizable boundary, and only relatively few particles are discharged together with the gas flow (e.g. bubbling or sluggling fluidized beds). In the second case, particles are continuously discharged upwards of the fluidized bed, which are—usually by means of a separator—recycled into the system. Circulating fluidized beds are thus in any case fast fluidized beds, and the two expressions are used interchangeably herein.

A special case of a stationary fluidized bed is a fluidized charge from which, according to the definition, there is no discharge upwards together with the gas flow, but which is continuously supplied with particles, e.g. from a fast fluidized bed connected therewith, and from which approximately the same amount of particles is continuously withdrawn (downwards), in order to keep the extent of the fluidized bed substantially constant. This will be explained in more detail with reference to FIGS. 3 and 4.

A "fluidized bed reactor" or short "reactor" as used herein refers to a limited area within a fluidized-bed system, in which a defined fluidization state, i.e. stationary or fast fluidized, prevails and in which chemical and/or physical reactions take place under contact with the fluidized-bed particles. Due to the defined fluidization state within a reactor, the terms "fluidized bed" and "fluidized-bed reactor" are sometimes used synonymously herein.

A "fluidized bed reactor system" is an assembly comprising one or more fluidized-bed reactors including associated particle separators, connecting and supply lines, including any valves, flow controllers and other components, for carrying out chemical and/or physical reactions. If the system comprises more than one fast fluidized bed reactor, they preferably constitute separate gas chambers. To guarantee separation, gas barriers, such as siphons, may be provided, which are preferably also fluidized themselves.

As mentioned above, FIG. 1 is a schematic representation of a fluidized bed reactor system according to the state of the art comprising conventional, non-adjustable flow controllers, which is the result of earlier research conducted by the inventors (see PCT/AT2011/000254). It comprises two reactors 1 and 2, which are both implemented as fast fluidized beds, the positions of which (i.e. the positions of the fluidized particles) are represented by means of dots or grey shading. A particle line 7 connects the particle separator 3 of the first reactor with the second reactor, another particle line 8 leads from particle separator 4 of the second reactor back into this reactor, and a third particle line 17 leads from the second back to the first reactor. This third particle line 17 connects the two reactors preferably in their lower halves, more preferably lower thirds or quarters, as the inventors disclose in their WO 2009/021258 A1, in order to be able to control the particle distribution within the system more accurately. In particular, line 17 exits reactor 2 and enters reactor 1 close to the bottom, as is also shown in FIG. 1.

All three particle lines 7, 8 and 17 comprise siphons, which are all fluidized, as is shown by the arrows, on the one hand to increase the transport of particles, and on the other hand to guarantee separation of the gas chambers of the two reactors. The reactors themselves are each fluidized in steps, i.e. fluidization gas is introduced into reactor 1 at 11 and 13 and into reactor 2 at 12 and 14 and exits the system through outlet 5 and 6 at the head of the respective separator. Such a stepped fluidization allows more accurate control of the fluidization state of the reactors.

Reactor 2 is separated into several reaction zones 10 located above each other by (non-adjustable) flow controllers 18, which are schematically shown as constrictions of the reactor cross-section, the purpose of which is explained below by means of a specific application example for such a fluidized-bed reactor system, namely chemical looping reforming (CLC).

Supply lines to reactor 2 are shown at 16 and 19, which for the CLC example are fuel supply lines. For example, a gaseous fuel, such as methane, can be introduced at 16, while a feed, at least partly consisting of solids, such as carbon, can be introduced at 19. However, it is also possible to simultaneously convert two different solid fuel fractions that require different dwell times in the reactor 2 to be converted efficiently. While a fast degassing fuel, e.g. plastic waste, is fed via 16, for example carbon particles can be introduced via 19. The supply line 15 can serve to also introduce a feed, such as a fuel gas, into reactor 1.

Looking at the fluidized-bed reactor system of FIG. 1 as a whole, a particulate oxygen carrier can be (re)oxidized and heated in the air reactor 1 for the CLC example, followed by supplying it via particle line 7 into a reaction zone 10 of the fuel reactor 2, where it preferably descends downwards within the fluidized bed of this reactor and thus provides for the oxidation, i.e. combustion, of one or more fuels supplied via 16 and/or 19 in the individual reaction zones. Then, the oxygen carrier is fed back into the air reactor 1, where it is regenerated. Fuel reactor 2 can collect solid, but relatively fine, combustion residues, such as flue ash in the case of coal combustion, at particle separator 4 and feed them back into the system via particle line 8, where they again make contact with the oxygen carrier, which guarantees complete combustion of the fuel. At the same time another, e.g. gaseous, fuel, such as methane, can be introduced so that the individual reaction zones 10 contain different amounts of different reaction partners, which also provides for different temperatures and different sum reactions. For example, they produce varying amounts of heat and varying sizes of the solid reaction products, depending on the location of the respective reaction zone. In total, the flow controllers increase the completeness of the combustion reactions and thus the yields and efficiency of the processes in general.

A disadvantage of this embodiment of a fluidized-bed reactor system is, however, that control of the particle cycle as a whole and of the amount of particles in the individual reaction zones is practically only possibly via the amount of fluidization gas, which can be fed into the reactors at positions 11 to 14 or develop within the system. In addition, the total particle cycle and the particle amounts in the individual reaction zones cannot be controlled independently of each other. After installation of the flow controllers in reactor 2, the flow states achievable by variation of fluidization are fixed.

Figure 2:
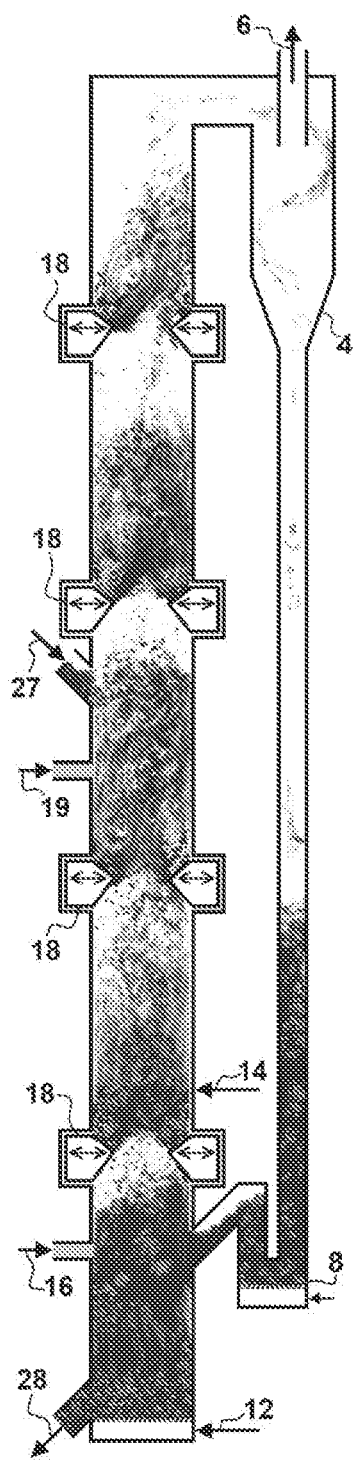
FIG. 2 schematically shows a simple embodiment of the inventive fluidized-bed reactor system with only one fluidized-bed reactor containing several accurately adjustable flow controllers.

One example of a solution for this problem according to the present invention is shown in FIG. 2 in the form of a relatively simple embodiment of the invention. The fluidized-bed reactor system shown comprises one single reactor, which is designed and numbered similar to the system of FIG. 1. It comprises a fast fluidized bed, which is created by supplying fluidization gas via 12 and 14 for a particulate charge. As before, gas exits at position 6, while particles are recycled via separator 4, which may for example be a cyclone, and line 8. Again, at position 16 and 19, (equal or different) feeds of raw material to be treated in the reactor can be introduced, while supply line 28 may serve for e.g. supplementing parts of the particulate bed material lost by abrasion, and line 28 may serve for removing coarse particles, e.g. coarse ash developing during combustion of the feed.

When using such fluidized-bed reactor systems for combustion or gasification applications, fuels can for example be introduced via supply lines 16 and 19, addition bed material—in this case e.g. silica sand and any additives, such as dolomite—may be introduced at position 27, and coarse ashes developed may be removed at 28.

Reference number 18 again refers to flow controllers that reduced the cross-section of the reactor at predetermined locations and thus divide it into several reaction zones. The four flow controllers 18 shown thus divide the reactor into five reaction zones with different sojourn probabilities of the bed material and the fuel particles. Contrary to the state of the art, however, these flow controllers according to the invention, which are shown as sliders herein, are accurately adjustable as indicated by the arrows, so that the particle amounts present in the respective reaction zones above them and in the lowermost reaction zone are controllable—while the fluidization of the reactor remains the same.

Since thermal reactions of solid fuel particles—like gasification—lead to the development of gases, the respective overall gas volume flow (as well as the gas rate) in the fluidized bed is directly related to the gas production within the respective reaction zone 10. When varying the solid fuel with regard to its lumpiness (particle size), its water content and heat value, and its volatile portions, the inventive provision of adjustable flow controllers for the fluidized bed constitutes the key for targeted regulation with the object of maximizing gas-solid contacts and achieving the highest possible dwelling times. This holds for gaseous phase flows as well as for all movements of solids (bed material, additives, fuel particles). In this way, the inventive fluidized-bed reactor system can be adapted to different circumstances, e.g. also to varying conditions of the two feeds introduced at 16 and 19, without the necessity to shut down the system or even changing the fluidization extent. In the application example for gasification described above, a shift of the feed ratio towards larger amounts of particulate feed, e.g. coal or woodchips, via line 19 can, for example, be reacted to by moving the two lowermost of the accurately adjustable flow controllers 18 inwards and the two uppermost flow controllers outwards, which allows an adjustment of the flow rates of the fluidized bed at these locations. The optimal settings can be determined by simple pressure measurements over the entire height of the reactor 2. As mentioned above, decomposition of the solid fuel (i.e.

degasification of the volatile solid fuel portions) leads to the production of gas in the reaction zone joined by line 19. Subsequently, the gas rate within the constrictions of the flow controllers in the upper zones can be accurately adjusted to make sure that there is no undesirably high particle discharge from the reactor 2. At the same time, accurate adjustment of the lower flow controllers guarantees dwelling times that are sufficiently long for the remaining fuel particles with in the reactor 2 that are harder to gasify. This results in an intensive contact between this feed and the bed material, which increases completeness of the reaction as a whole and thus the yields.

If with combustion or gasification applications, however, the ratio of the two feed streams shifts towards the e.g. mainly fast degassing feed (i.e. fuel) introduced via line 16, the flow controllers may be adjusted so that an optimal mixing of the particles in the reaction zones above is provided in order to provide for a more intensive contact of this feed with the bed material. This increases the efficiency of the gasification or combustion reactions and reduced tars developing during gasification or reduces other contaminations through the intensive contact with the bed material ad additives. The inventive fluidized-bed reactor system with the accurately adjustable flow controllers is thus much more flexible than the known systems according to the state of the art. The core of the invention is the accurate adjustment of the reactor geometry by means of the flow controllers with regard to different, locally present gas volume streams over the height of the reactor while the fluidized bed is in operation. At the same time it allows for a direct and quick reaction to load changes resulting from inhomogeneous fuels, e.g. waste, which often leads to problems in standard systems. In addition, it is possible to provide a specifically desired partial load of the fluidized bed without the necessity to leave an optimal operation point, since the geometry of the fluidized-bed system can be adapted correspondingly.

Figure 3:
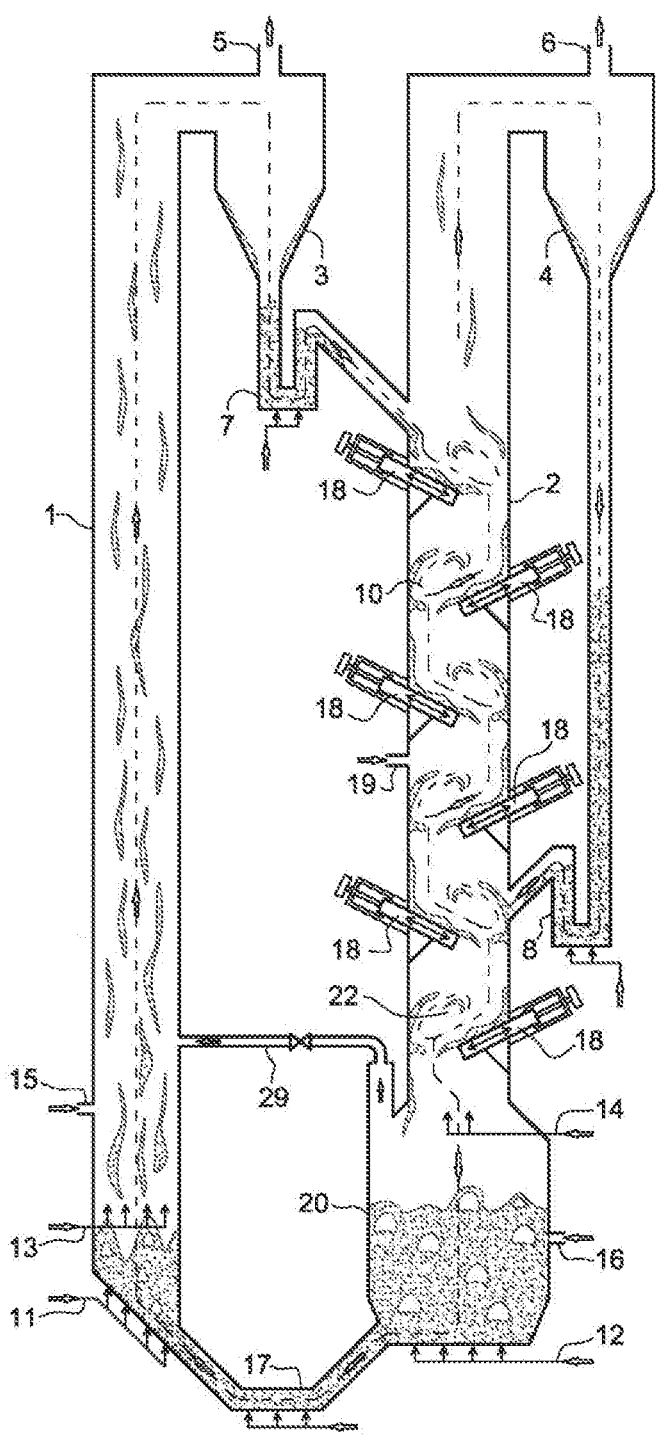
FIG. 3 schematically shows an embodiment of the inventive fluidized-bed reactor system with three reactors.

FIG. 3 shows another embodiment of the fluidized-bed reactor system of the invention, which comprises three reactors with the reference numbers 1, 2 and 20 (same reference numbers again refer to the same components, i.e. in analogy with the two drawings described above). The reactors 1 and 2 are fast fluidized beds, while reactor 20 represents a bubbling, stationary fluidized bed and is positioned in flow direction between reactor 2 and reactor 1, more precisely reactor 2 passes into reactor 2 at its lower end. The fluidized bed in reactor 20 is thus supplied with particles from reactor 2, which again circulate via separate 4 and line 8. Connection lien 17 leads the particles (back) to reactor 1.

In this case, a gas line 12 mainly serves to fluidize the stationary reactor 20, while reactor 2 is mainly fluidized via line 14 and the gases developing in reactor 20. Fuel particles that have not been completely reacted (such as slowly (de)gasifying fuels), which fall rom reactor 2 into reactor 20, have another chance to be reacted there, which means an increase of the dwelling time.

Reference number 29 indicates a connection line substantially transporting only gas between the reactors 1 and 2, which is also the result of earlier research by the inventors (see PCT/AT2011/000311) and serves, on the one hand, to allow syn-chronization of the pressure conditions of the two reactors. On the other hand, this line 29 has a great advantage when this fluidized-bed reactor system is used for gasification reactions, wherein recently biomass gasification has been gaining importance in addition to the classic coal gasification. For producing heat in a combustion or air reactor (in this example, reactor 1), it is not only necessary to combust the product gas, which is to be obtained from the gas production reactor (also "fuel reactor" or "gasification reactor"; here, reactor 2) as purely as possible, but raw product gas can also be transferred from the gas production reactor via connection line 29 to the combustion reactor and used for the production of heat. In order to not disturb the solid cycle of the fluidized-bed reaction system, this line transports substantially only gas.

For this reason, line 29 joins reactor 2 at the head of a vertical extension thereof: According to the above definition, a fluidized-bed reactor is characterized by a precisely defined fluidization state. Thus, reactor 20 is limited by the height of the stationary fluidized bed and does not extend beyond it. Furthermore, the gas space of the fast fluidized reactor 2 begins directly above it. Consequently, the vertical extension of the reactor contains an inherently low particle density, which is why line 29 does practically not transport any particles. This can be further supported by components such as filters, cyclone separators or the like.

Particle line 17 for feeding back the global solid stream into reactor 1 exits sideways at the bottom of reactor 20 and joins reactor 1 through its bottom, i.e. the particles transported therein are efficiently transported into reactor 1 by means of the fluidization of line 17 and the lower fluidization 11 of the first reactor, and from there pulled up into the reactor space 9 by means of fluidization 13.

The accurately adjustable flow controllers according to the present invention are again indicated by reference number 18 and in this case define a zigzag course of the reactor pipe, i.e. they extend the flow path of the fast fluidized by through reactor 2 and again divide the space within the reactor into reaction zones 10. Reference number 22 here indicates the lowest of the reaction zones, from where the fluidized-bed particles from reactor 2 fall down into the reactor 20 below it.

In this example, the adjustable flow controllers 18 are also shown as sliders, but they could also be flaps, rolls or the like, which would serve the same purpose. Again, the flow rate of the fluidized bed at the constriction points and thus the sojourn probability of particles above and below them are controllable by sliding the individual flow controllers inwards or outwards.

Figure 4:
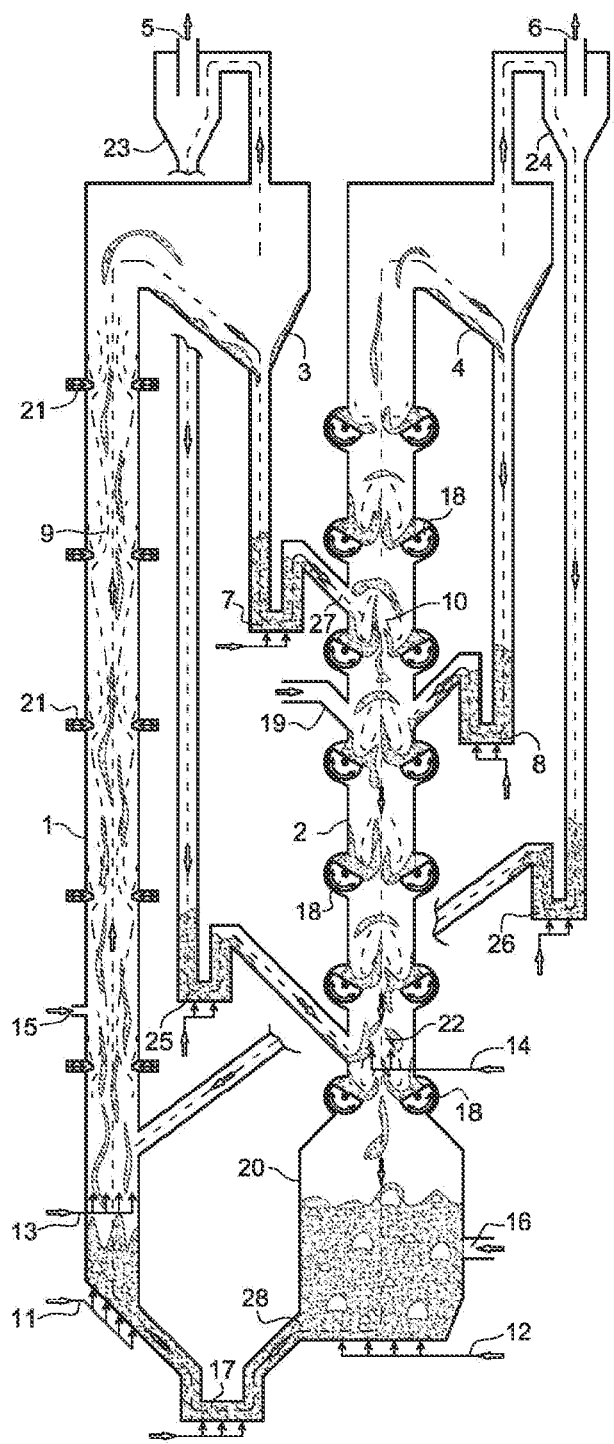
FIG. 4 schematically shows a further embodiment of the inventive fluidized-bed reactor system with three reactors.

FIG. 4 shows an alternative, preferred embodiment of the inventive fluidized-bed reactor system with three reactors. In this case, the particles discharged from the fast fluidized beds are separated in two stages: for reactor 1 in separators 3 and 23, and for reactor 2 in separators 4 and 24. The particles form the two additional separators 23 and 24 are transferred via the lines 25 or 26 from reactor 1 to another location in reactor 2, which is lower than the junction point of line 7, or from reactor 2 directly into reactor 1 surpassing reactor 20.

Here, the adjustable flow controllers 18 are schematically shown as rolls rotatable around a horizontal axis with a vertical cross-section in the form of a circular segment (with a central angle>180°), which are positioned in pairs at opposite sides of reactor 2. All rolls are accommodated in extensions of the reactor wall having a cross-section that provides for positioning of the rolls so that their flat external surface is substantially flush with the reactor wall, i.e. aligned in the same plane. However, if they are rotated, they increasingly narrow the flow cross-section for the fluidized bed and thus again divide the reactor space into reaction zones 10 or reaction zones 22.

For such flow controllers with flat surfaces "embedded" in extensions of the reactor wall or in recesses of a sufficiently thick reactor wall without extensions—irrespective of whether they are rolls, flaps or other components, the flow controllers are preferably flush or aligned with the reactor wall when they are in a position not narrowing the flow cross-section, in order to also allow unhindered, non-redirected gas flow within the reactor as would be the case in conventional fluidized-bed reactor systems without accurately adjustable flow controllers.

In the embodiment shown in FIG. 4, reactor 1 is also provided with accurately adjustable flow controllers 21, which are implemented as sliders in this case and divide the reactor space into several reaction zones 9.

Figure 5:
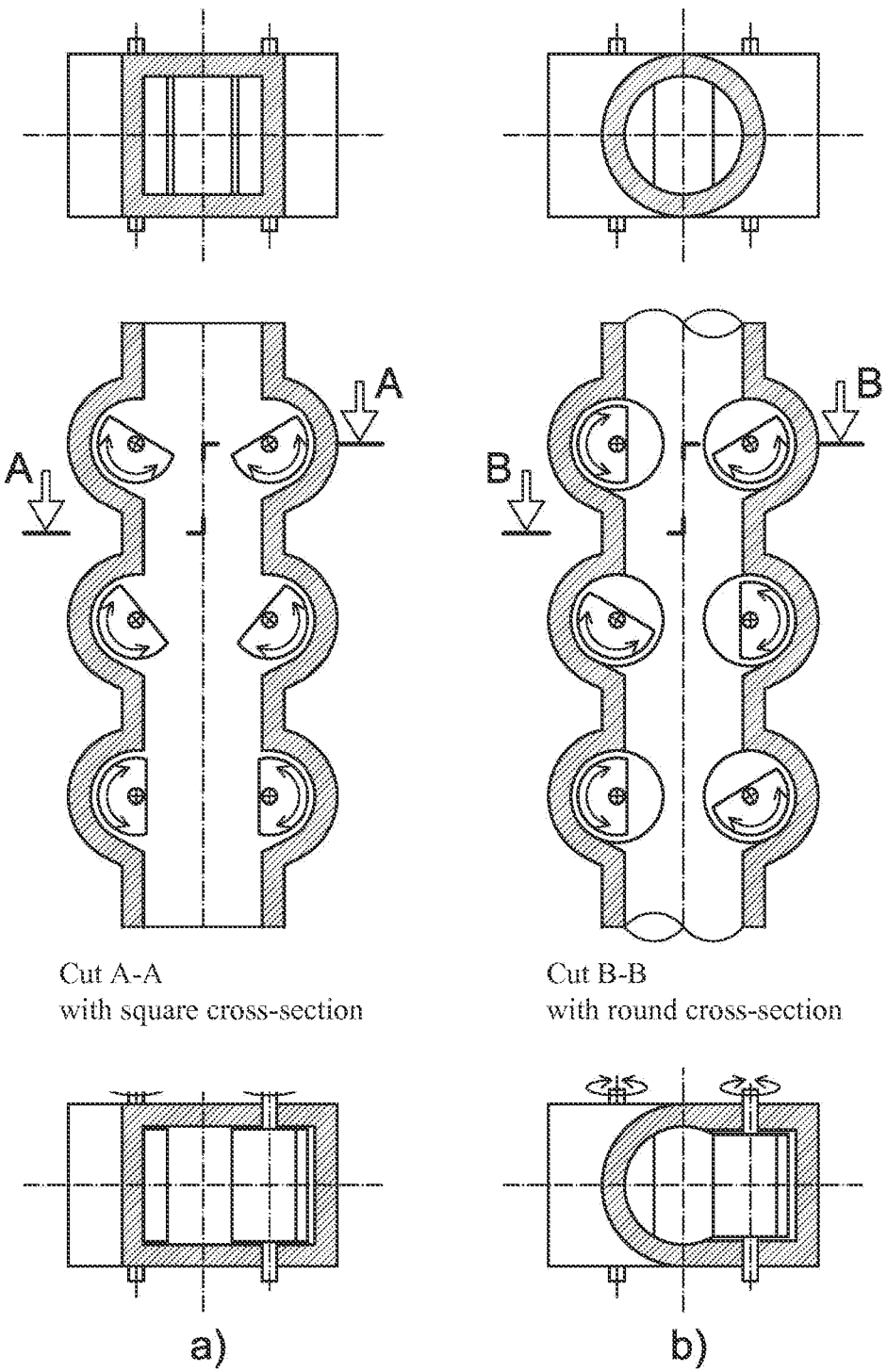
FIGS. 5 to 7 schematically show different preferred embodiments of accurately adjustable flow controllers.

FIGS. 5a and 5b show detailed views of reactor walls with extensions accommodating flow controllers, as they are also contained in the embodiment of FIG. 4, i.e. rolls with a vertical cross-section in the form of e circular segment with a central angle>180°. The figures comprise three drawings each, wherein the central ones each show a vertical cross-sectional view of a portion of the reactor wall comprising pairs of such flow controllers in different positions. The upper drawings each show a bottom view of the reactor, and the lower drawings each show a horizontal cross-sectional view along line A-A or B-B.

FIG. 5a shows a reactor with a square, and FIG. 5b a reactor with a circular cross-section, both having square extensions for accommodating the flow controllers at corresponding locations. The flow controllers are, like in FIG. 4, pairs of rolls positioned opposite of each other, which can be rotated synchronously, e.g. mirror-symmetric as in FIG. 5a, or independently, as in FIG. 5b, in order to change the flow cross-section correspondingly.

It is to be understood that flow controllers according to the present invention do not necessarily have to be provided in pairs, but can also be used individually. However, the use of pairs has the advantage that the flow controllers can have smaller dimensions when their position changes are synchronized to provide a desired narrowing of the flow cross-section.

Figure 6:
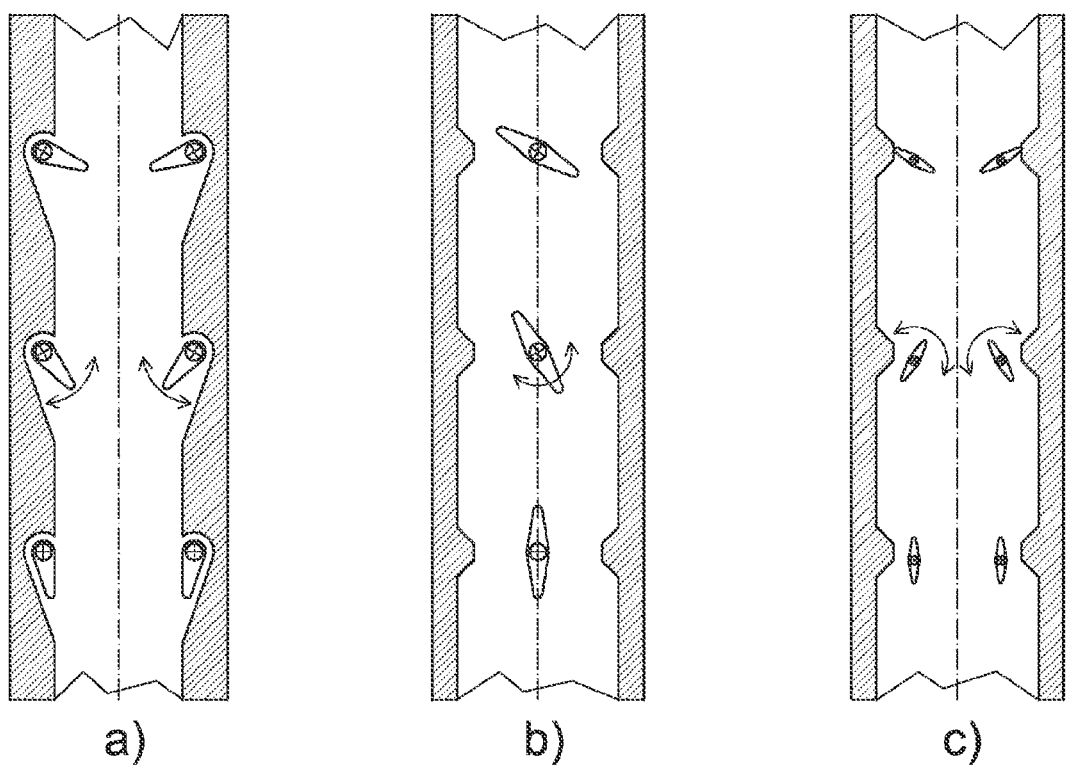

FIG. 6 shows partial views of three further embodiments of inventive fluidized-bed reactors with adjustable flow controllers in different positions. FIG. 6a shows pairs of opposite flaps swivable around a horizontal axis, which are accommodated in corresponding recesses of the reactor wall. FIGS. 6b and 6c each show a combination of known, non-adjustable flow controllers in the form of paired projections in the reactor wall and accurately adjustable flow controllers according to the present invention, which are provided at the respectively same heights. Here, FIG. 6b shows an embodiment in which a flap rotatable 360° around a horizontal axis is provided between a pair of projections, while in FIG. 6c pairs of those flaps, with smaller dimensions, are mounted between the paired projections. This representation again shows the above advantage of providing pairs of synchronously adjustable flow controllers, i.e. the possibility to reduce their dimensions.

Figure 7:
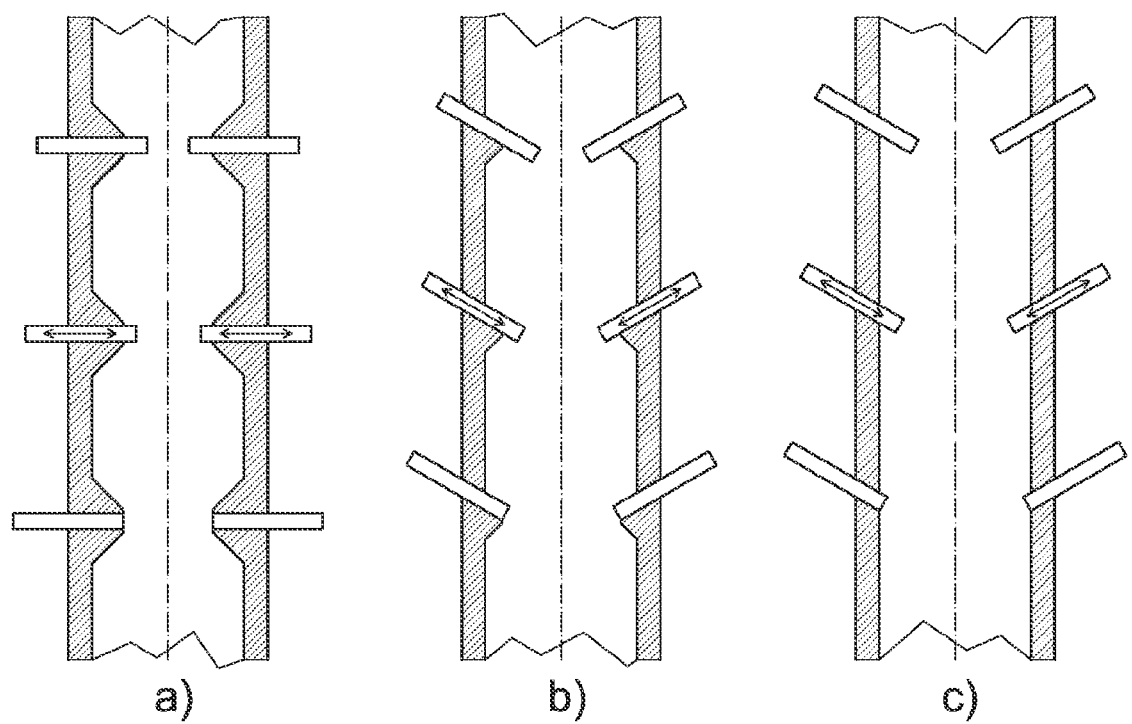

FIG. 7 shows pairs of opposite sliders as accurately adjustable flow controllers in a reactor wall. Here, the sliders extend through the reactor wall, can, however, preferably also be accommodated ("embedded") in a correspondingly thick reactor wall or in a corresponding extension of the same, in order to avoid complicated sealing of the reactor wall to the outside. FIGS. 7a and 7b each show sliders cooperating with known, non-adjustable flow controllers in the form of inner projections of the reactor wall. In FIG. 7a, sliders extend horizontally through respective projections, while in FIG. 7b the sliders are provided above the respective projections and at an acute angle with the horizontal line. FIG. 7c shows the same sliders as FIG. 7b, but without projection on the reactor wall.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The use of the article "a" or "the" in introducing an element herein should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A fluidized-bed reactor system, comprising:
 a fast fluidized bed reactor configured to carry out chemical or physical reactions,
 wherein the fast fluidized bed reactor is configured to be operated as a circulating fluidized bed,
 wherein the fast fluidized bed reactor comprises, at the upper end, a fluid outlet, a particle separator, and a particle line connected so as to feed back separated fluidized-bed particles into the same or another reactor,
 wherein one or more flow controllers are provided in at least one fast fluidized reactor in order to create separate reaction zones therein, and
 wherein one or more of the flow controllers are accurately adjustable from outside of the system to control flow conditions in the reaction zones while the fast fluidized bed reactor is in operation.

2. The system of claim 1, wherein a horizontal cross-sectional area of the at least one fast fluidized reactor at a height of an accurately adjustable flow controller, is changeable by adjusting the flow controller.

3. The system of claim 1, wherein at least one of the accurately adjustable flow controllers can be adjusted by hand.

4. The system of claim 1, wherein at least one of the accurately adjustable flow controllers is driven by a motor.

5. The system of claim 1, wherein the accurately adjustable flow controllers are supported rotatably, swivellably, slidably, or a combination thereof, on or in a respective reactor wall.

6. The system of claim 1, further comprising:
 an accurately adjustable and locally fixed flow controller.

7. The system of claim 1, comprising:
 at least two reactors, both implemented as fast fluidized reactors,
 wherein a first particle line connects a first reactor particle separator with the second reactor, wherein a second particle line of a second reactor particle separator leads back into the second reactor, wherein a third particle line leads back into the first reactor, wherein at least the second reactor comprises an accurately adjustable flow controller.

8. The system of claim 7, wherein each of the two reactors comprise an accurately adjustable flow controller.

9. The system of claim 1, at least one particle line joins a respective reactor above at least one flow controller.

10. The system of claim 7, wherein two of the reactors are additionally connected to each other by a line substantially transporting only gas.

11. The system of claim 1, wherein at least one of the flow controllers is adjustable horizontally.

12. The system of claim 1, wherein at least one of the flow controllers is adjustable vertically.

13. The system of claim 1, wherein at least one of the flow controllers is adjustable horizontally and vertically.

14. The system of claim 7, wherein the third particle line connects the two reactors in their lower halves.

15. The system of claim 7, wherein the third particle line connects the two reactors in their lower thirds.

16. The system of claim 7, wherein the third particle line connects the two reactors in their lower quarters.

17. The system of claim 1, comprising:
an accurately adjustable flow controller in each reactor.

18. The system of claim 1, comprising:
an accurately adjustable flow controller in two reactors.

19. The system of claim 1, comprising:
two or more fast fluidized bed reactors, each comprising a separate gas chamber.

20. The system of claim 1, wherein the adjustable flow controller is arranged on or in a fast fluidized bed reactor wall.

* * * * *